United States Patent [19]

Fagan

[11] Patent Number: 4,970,921

[45] Date of Patent: Nov. 20, 1990

[54] DROP CEILING INSTALLING TOOL & METHOD

[76] Inventor: Terry E. Fagan, 398 Quercus Dr., Edwardsville, Ill. 62025

[21] Appl. No.: 355,003

[22] Filed: May 19, 1989

[51] Int. Cl.$^{5}$ ...................... B25B 13/06; B23D 63/06; B23P 11/02

[52] U.S. Cl. .................................... 81/121.1; 81/53.1; 29/525.1; 248/546

[58] Field of Search ...................... 81/121.1, 125, 53.1, 81/436, 451; 248/544, 546, 547; 29/525.1

[56] References Cited

U.S. PATENT DOCUMENTS 1,223,791 4/1917 Jackson ................................ 81/53.1

*Primary Examiner*—Joseph M. Gorski
*Assistant Examiner*—S. Thomas Hughes
*Attorney, Agent, or Firm*—Don W. Weber

[57] ABSTRACT

A simple device and method for attaching a hanger bracket to a base ceiling is presented which greatly enhances the speed with which a drop ceiling may be installed. A cylindrical main body is surrounded by a rectangular hanger bracket support. The main body and hanger bracket support are attached together and the main body has a longitudinal cylindrical hole into which may be inserted a standard socket extender. The drive shaft of the socket extender protrudes out the bottom of the main cylindrical body. The rectangular hanger bracket support is longer than the diameter of the cylindrical body and this protruding end has a trapezoidal section cut out so that the work piece may be easily inserted and removed once installed. The main cylindrical body and hanger support are attached to the top of a telescoping pole. The drive shaft is inserted into the socket located on the inside of the top of the telescoping pole. The work piece is loaded onto the hanger support and a drill is attached to the bottom of the telescoping pole. Rotating the pole, hanger support, and work piece attaches the hanger bracket to the base ceiling. The trapezoidal cut out then enables the operator to easily withdraw and remove the hanger support and pole. The process is repeated as many times as necessary for installing a drop ceiling.

4 Claims, 2 Drawing Sheets

DROP CEILING INSTALLING TOOL & METHOD

BACKGROUND OF THE INVENTION

This invention relates to the field involving installation of drop ceilings and the like. The tool described herein and method for attaching a hanger bracket to a base ceiling may also be utilized for attaching hanging baskets, swag lights, or other apparatus to a ceiling. The instant invention is designed particularly for use in installing drop ceiling hangers to the base ceiling so that a metal framework for a drop ceiling may be attached.

In many building renovations or new construction it is desirable to attach a ceiling beneath the surface of the structural ceiling. This structural, or base, ceiling would normally be attached directly below the roof of the building. When it is desired to attach a drop ceiling below the base ceiling, one must first necessarily attach a metal framework beneath the base ceiling. This metal framework, once attached and leveled, may then be covered with small panels (normally 2 feet by 4 feet) which then completely cover the base ceiling and comprise the drop ceiling.

A number of devices have been patented directed to this particular problem. Of particular note is the 1987 patent issued to James Fall, U.S. Pat. No. 4,706,380. This patent involves a driver apparatus whereby a screw and hanger is threadedly driven into a wooden ceiling member from the floor level. The problem attacked by Fall involves attaching the hanger to the base ceiling from the floor while still being able to withdraw the driver apparatus without unduly entangling the wire which is attached to the bottom vertical leg of the hanger bracket. Once the hanger bracket is attached to the base ceiling, the attaching wire hangs from the hanger bracket a length of approximately one foot to eighteen inches. It is to these lower wires that the drop ceiling frame is attached. As shown in the Fall Patent, twisting the wire onto the vertical leg of the hanger and withdrawing the driver apparatus may involve an extensive outer shell and twisting mechanism as well as an intricate means for withdrawing the wire.

It is an object of this invention to provide a simple yet effective means for attaching the wire and hanger bracket to the base ceiling while the operator is located on the floor. Since attaching the wire to the hanger bracket may be conveniently done at floor level, this device greatly simplifies the installation of a drop ceiling. It is also an object of this device to provide a work piece support which may be easily attached to the end of a telescoping pole so that a drop ceiling hanger bracket and wire may be attached to a base ceiling and easily withdrawn.

It is also an object of this invention to provide a simple method for attaching drop ceiling hanger brackets and wires to a base ceiling from the floor. Other and further objects of this invention will become apparent upon further reading of this specification.

BRIEF SUMMARY OF THE INVENTION

The drop ceiling installing tool comprises an inner cylindrical main body surrounded by an outer rectangular hanger bracket support. The inner cylindrical body has a longitudinal cylindrical hole in it which is shaped so as to receive a socket extender. Three sides of the outer rectangular hanger support are connected to the outer surface of the main cylindrical body at three tangential points. The rectangular hanger support also has a protruding end which is shaped to receive the vertical leg of the hanger bracket. This fourth side of the outer rectangular hanger has an essentially trapezoidal portion cut from it. This trapezoidal opening in the fourth side of the rectangular hanger support allows for the easy withdrawal of the vertical leg of the hanger bracket and the downwardly extending wire once the hanger bracket has been securely fastened to the base ceiling by means of the screw. A socket extender is detachably positioned within the longitudinal cylindrical hole in the main body. The upper part of the socket extender has a standard hexagonal opening to receive the top of the screw head for fastening to the ceiling. The lower end of the socket extender has a drive shaft protruding out from the main body. This lower drive shaft may be detachably inserted into a drive shaft receiving socket located in the upper part of the telescoping pole. The entire telescoping pole may be lengthened or shortened according to the length from the operator to the ceiling. A drill is attached to the bottom of the telescopic pole.

The method described herein begins by attaching the wire to the hanger bracket by twisting the support wire through the hole in the vertical leg of the hanger bracket. A screw is then placed through the horizontal leg of the hanger bracket and the assembled work piece is then placed on the top of the tool with the vertical leg of the hanger bracket being placed between the main body and the fourth side of the work holder. With the telescoping pole adjusted to the right length the screw is then rotatably attached to the base ceiling by using the drill which may be operated from the floor level. Once the screw has been secured to the base ceiling and the hanger bracket attached, the telescoping pole is then removed from the work piece leaving only the hanger bracket and the wire attached to the ceiling. This operation may then be repeated to attach as many hanger brackets as desired.

While the normal method for attaching hanger brackets and wires for a drop ceiling is by hand, it has been found that the use of this device increases the speed with which hanger brackets may be attached by nearly three fold. An average of two hundred of these hanger brackets may be attached per day by a workman. Utilizing this particular device, between four and six hundred hanger brackets may be attached to a ceiling by the average workman in an eight-hour day. The use of the instant device dramatically increases the efficiency and lowers the cost of installing a drop ceiling.

DETAILED DESCRIPTION OF THE PREFERRED EMBODIMENT

Figure 3:
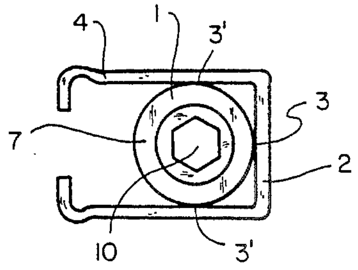
FIG. 3 is a top view of the device as shown in FIG. 1.

The drop ceiling installation tool has two main parts. The inner cylindrical main body 1 is surrounded by an essentially rectangular outer hanger support 2. This essentially rectangular hanger support is fixedly attached to the inner main cylindrical body at three tangential points (shown on FIG. 3 at 3 and 3'). This outer rectangular hanger support has a protruding end 4 which extends beyond the diameter of the inner cylindrical main body. The outer portion of the hanger support has hanger bracket receiving bulges 19.

Figure 2:
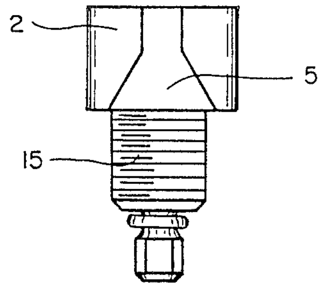
FIG. 2 is a view of the main body and rectangular hanger support taken along the lines 2—2 in FIG. 1 showing the trapezoidal cut out.
Figure 6:
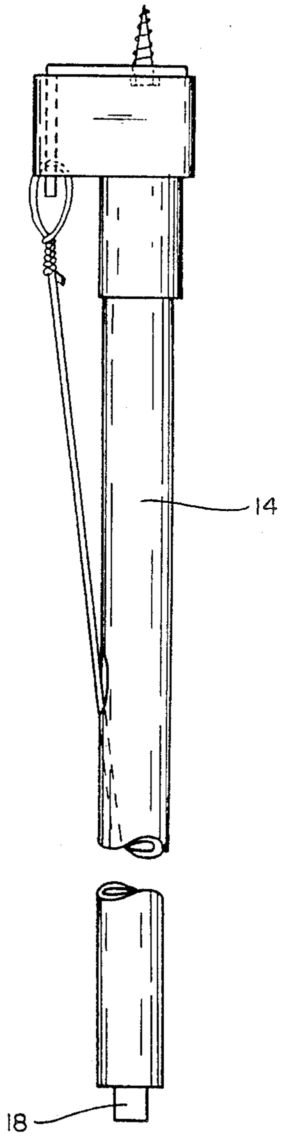
FIG. 6 shows the work piece as it is attached to the tool prior to a screw being inserted into the base ceiling.
Figure 5:
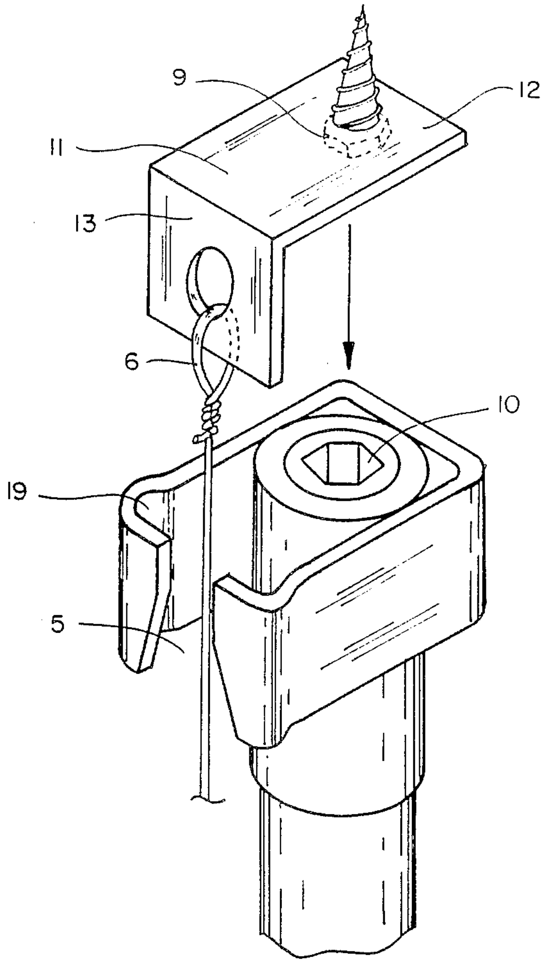
FIG. 5 is a perspective view of the device showing the top end of the telescoping pole, the main cylinder and rectangular bracket, and the work piece prior to its insertion into the tool.

As best shown on FIGS. 2, 5 and 6 the protruding end of the rectangular hanger support has an essentially trapezoidal portion 5 cut therefrom. This essentially trapezoidal void 5 is cut out of the fourth side of the outer rectangular hanger support to accommodate the twisted and attached end of the hanger wire 6.

Figure 1:
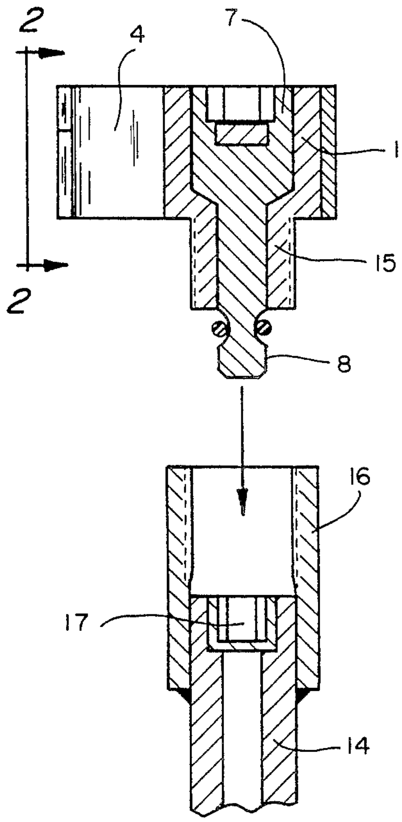
FIG. 1 is a side cut away view of the drop ceiling installation tool including the top end of the telescoping pole.

As best shown on FIG. 1, a socket extender 7 is located within the inner cylindrical main body 1. This socket extender 7 has a lower protruding end 8. This lower protruding end is the drive shaft for the socket extender 7. The upper part of the socket 7 has an hexagonal opening 10 for receiving the head of the attaching screw 9.

The work piece to be attached includes the screw 9, the hanger wire 6 and the L-shaped hanger bracket shown generally at 11, FIG. 5. The screw 9 is inserted as shown on FIG. 5 into the hole in the horizontal leg 12. The hanger wire 6 is attached to the vertical leg 13 of the hanger bracket as shown in FIG. 5.

In the preferred embodiment, the main body and rectangular hanger support are connected to the top of a telescoping pole 14 by means of threading. The lower portion 15 of the main cylinder 1 has outside threads as shown in FIG. 2. At the top of the telescoping pole 14 is a tool receiving cap 16 which has inside threads as shown on FIG. 1. The main body and rectangular hanger support is thus easily attached to the top of the telescoping pole by means of screw threading. At the very top of the telescoping pole there is a drive shaft receiving hole 17 which receives the lower protruding end 8 of the socket extender 7 as best shown in FIG. 1.

The method of use of this particular device is simple and inexpensive. A support wire 6 is attached to the vertical leg 13 of the hanger bracket at floor level by twisting as shown in FIG. 5. The attaching screw 9 is then placed through the horizontal leg 12 of the hanger bracket and the device is attached to the top of the telescoping pole 14. The hanger bracket, wire and screw thus comprise the assembled work piece to be attached to the base ceiling.

With the work supporting holder (which comprises the inner cylindrical main body and the outer rectangular support hanger) attached to the upper part of the telescoping pole, the work piece is ready to be attached to the base ceiling. The operator, who remains on the floor, adjusts the length of the telescoping pole so that the screw touches the base ceiling. The lower end of the telescoping pole has a drill receiving knob 18 and the pole is attached by the operator to an electric drill by means of said knob 18. The entire pole, work support and work piece are then rotated until the screw is firmly attached to the base ceiling. Once the hanger bracket is firmly attached to the base ceiling, the work holder and telescoping pole may be lowered thus leaving the hanger bracket and wire in place. This process may be repeated in the locations desired to produce a series of firmly attached drop ceiling hanger brackets and wires. Completing the drop ceiling may then be accomplished by attaching the metal frame to the bottom of the drop ceiling hanger wires and positioning the panels appropriately.

It has been found that steel or other suitable strong metal is desired for constructing the inner cylindrical main body and the outer rectangular hanger support. A standard socket extender may be used in this device. Using standard socket extender devices will enable the workman to attach screws with varying size heads. It is also within the contemplation of this invention that a standard 5/16" hexagonal nut opening may be permanently affixed at the top of the main cylinder. However, in the preferred embodiment, the detachable socket extender as shown in FIG. 1 is found to be most suitable.

Attaching the main body and rectangular hanger support to the upper end of the telescoping pole by means of threads is the preferred method of attachment. However, this main body and hanger support may be attached to the top of the pole in any convenient manner such as with screws or friction fittings.

Figure 4:
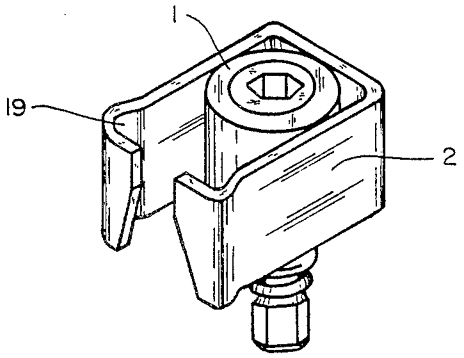
FIG. 4 is a perspective view of the device as shown in FIG. 2.

In the preferred embodiment, the fourth side 4 of the outer rectangular hanger support has an opening cut therefrom which is essentially trapezoidal in shape, as best shown in drawings FIGS. 2 and 4. However, it is within the contemplation of this invention that the cut out from the fourth side may be of many varying geometric shapes and the preferred embodiment is shown as means of illustration and not limitation.

It is well within the contemplation of this invention that precise measurements or geometric configurations as set out herein may be varied according to the spirit and disclosure of the invention herein. The preferred embodiment as shown and described in the instant specification is meant as a means of illustrating the general parameters of the instant invention and are not meant as limitations thereon.

Having fully described and disclosed my new invention, I claim:

1. An apparatus for installing drop ceilings, comprising:

(1) an L-shaped hanger bracket having a horizontal leg and a vertical leg wherein said horizontal leg has a central hole for receiving a standard hexagonal head attaching screw and said vertical leg has a hole for attaching a hanger wire;

(2) an inner *main* cylindrical body having an upper and lower portion and having a longitudinal cylindrical shaft therethrough for receiving a socket extender;

(3) an outer hanger support having four sides and a *generally* rectangular cross-section, wherein said sides are parallel to *a* longitudinal axis of said main cylindrical body, three of said sides tangentially attached about *and to* said main *cylindrical* body and said fourth side comprising a hanger bracket receiving and releasing protruding end, wherein said fourth side has opposed vertical bulges for receiving the vertical leg of the L-shaped bracket and an essentially trapezoidal section cut *from said fourth side;*

(4) *a* socket extender detachably located within said main cylindrical body and having a lower protruding end;

(5) a rotatable telescoping pole defined by an upper portion and a lower portion;

(6) a means for attaching said main cylindrical body and hanger support to said rotatable telescopic pole;

(7) a means for rotating said socket extender;

whereby said L-shaped bracket and hanger wire may be attached to a ceiling from floor level by means of a standard hexagonal head screw.

2. The apparatus for installing drop ceilings as in claim 1, wherein the lower portion of said main cylindrical body has outside threads, *and wherein said means for attaching said main cylindrical body and said hanger support to said telescoping pole comprises* a tool receiving cap attached to the upper portion of said telescoping pole for threadably receiving the lower portion of the main cylindrical body.

3. *The apparatus* for installing drop ceilings as in claim 2, wherein the upper portion of said telescopic pole has a socket extender drive shaft receiving hole for drivingly receiving the lower protruding end of said socket extender.

4. The apparatus for installing drop ceilings as in claim 1, wherein a standard 5/16 inch hexagonal nut opening is permanently affixed at the top of the main cylindrical body, whereby said L-shaped bracket may be affixed to a ceiling by a 5/16 inch hexagonal head screw.

* * * * *